United States Patent [19]

Gallusser et al.

[11] E Patent Number: Re. 32,787

[45] Reissued Date of Patent: Nov. 22, 1988

[54] SEALING RING FOR AN ELECTRICAL CONNECTOR

[75] Inventors: David O. Gallusser, Oneonta; David W. MacAvoy; Stephen Punako, both of Bainbridge; David L. Frear, Afton, all of N.Y.

[73] Assignee: Amphenol Corporation, Wallingford, Conn.

[21] Appl. No.: 834,982

[22] Filed: Feb. 28, 1986

Related U.S. Patent Documents

Reissue of:

[64] Patent No.: 4,456,320
Issued: Jun. 26, 1984
Appl. No.: 402,528
Filed: Jul. 28, 1982

[51] Int. Cl.[4] ..... H01R 13/52
[52] U.S. Cl. ..... 439/271; 439/312
[58] Field of Search ..... 339/89 R, 99 M; 179/75 R, 77 R; 277/75, 205; 285/336; 439/271, 272, 312

[56] References Cited

U.S. PATENT DOCUMENTS

| | | | |
|---|---|---|---|
| 2,450,528 | 10/1948 | Sprigg | 174/77 R X |
| 2,655,638 | 10/1953 | Alba | 339/94 M X |
| 3,214,182 | 10/1965 | Herbruggen | 277/75 X |
| 3,221,292 | 11/1965 | Swanson et al. | 339/217 |
| 3,915,463 | 10/1975 | Pippert | 277/205 |
| 4,109,990 | 8/1978 | Waldron et al. | 339/89 M |

FOREIGN PATENT DOCUMENTS

| | | |
|---|---|---|
| 0090074 | 11/1983 | European Pat. Off. . |
| 2200695 | 4/1979 | France . |
| 2061027 | 5/1981 | United Kingdom . |

*Primary Examiner*—Eugene F. Desmond
*Attorney, Agent, or Firm*—Bacon & Thomas

[57] ABSTRACT

This invention provides an improved moisture seal for an electrical connector assembly. The invention is characterized by an annular rubber member (10) having generally flat surfaces (11, 12, 13, 14) and an annular groove (15) in one of the surfaces (11) that abuts against a forward surface of one of the housings (30). A second groove (16) extending radially from the annular groove (15) to a circumferential surface (14) provides an escape path for air that would normally be trapped in the annular groove (15) when the sealing member (10) is compressed.

5 Claims, 1 Drawing Sheet

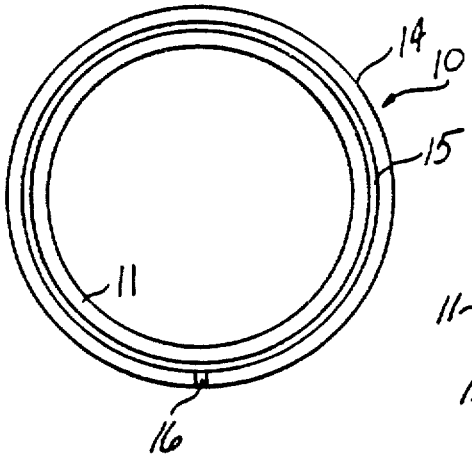
Fig 1
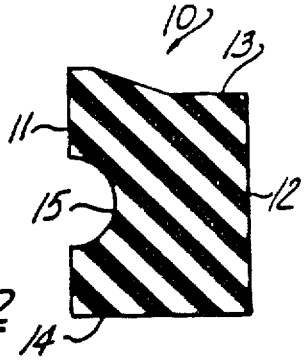
Fig-2
Fig-3
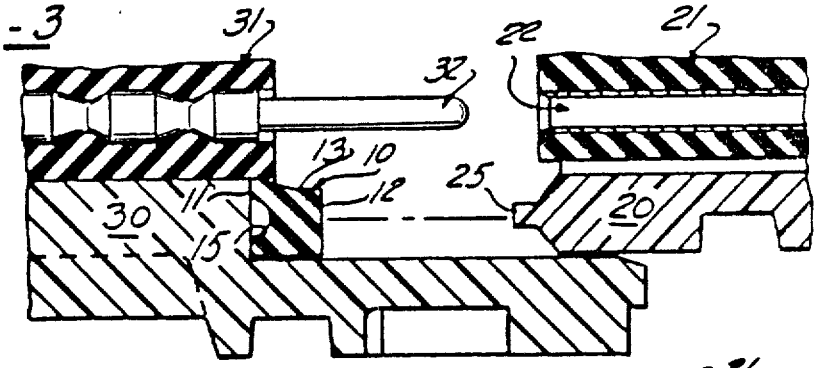
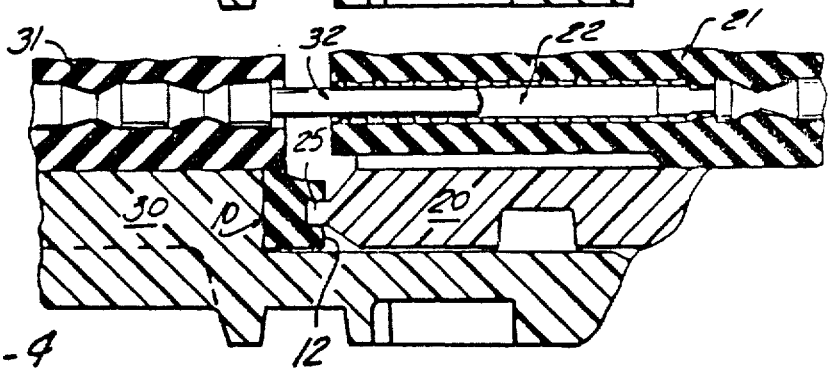
Fig-4

SEALING RING FOR AN ELECTRICAL CONNECTOR

Matter enclosed in heavy brackets [ ] appears in the original patent but forms no part of this reissue specification; matter printed in italics indicates the additions made by reissue.

This invention relates to an electrical connector and more particularly to a moisture seal.

An electrical connector assembly is generally comprised of two separate housings connected together by a coupling ring mounted on one of the housings. In cylindrically shaped connectors there are bayonet type couplings, which include an internal groove that mates with a pin on a housing, a threaded coupling which includes threads that mate with threads on a housing so that when a coupling member is rotated the housings are drawn together mating the contacts within the housing. In many environments water or moisture present in the air present a problem to the electrical connections within a mated electrical connector assembly. Accordingly some connectors provide a rubber O ring between the connector housings to provide a moisture seal when the coupling ring is rotated and the housings held together. An example of a multi contact electrical connector having a coupling ring may be found in U.S. Pat. No. 3,221,292 entitled "Electrical Connector" issued Nov. 30, 1965. In some instances, because of the limited space available for the moisture sealing ring, the ring prevents the coupling ring from drawing the housings together as far as would otherwise be possible because there is no place for the deformed material of the O ring to displace itself.

DISCLOSURE OF THE INVENTION

This invention provides an improved moisture seal for an electrical connector assembly. The invention is characterized by an annular rubber member having generally flat surfaces and an annular groove in one of the surfaces of the member that abuts against a forward surface of one of the housings. A second groove extending radially from the annular groove to a circumferential face provides an escape path for air that would normally be trapped in the annular groove when the sealing member is compressed.

Accordingly, it is an advantage to provide an improved moisture seal for use in an electrical connector.

DETAILED DESCRIPTION OF THE INVENTION

FIGS. 1 and 2 illustrate an annular sealing member and a cross sectional view of the sealing member which incorporates the principles of this invention.

FIGS. 3 and 4 illustrate a portion of electrical connector assembly utilizing the invention.

Referring now to drawings FIG. 1 illustrates an annular sealing member 10 comprised of an elastomeric material such as rubber. The sealing member 10 includes an inner circumferential face 13, an outer circumferential face 14, a rear face 11 having an annular groove 15 therein, and a second groove 16 extending radially from the first annular groove 15 to the outer circumferential face 14.

FIG. 2 is a cross sectional view of the annular member 10 and illustrates how the forward face 12 of annular member 10 has an area less tha the area of the rearward face 11 having the annular groove 15 therein.

FIG. 3 illustrates a portion of an electrical connector assembly in an unmated position. The electrical connector assembly generally includes two separate housings 20, 30 each having inserts 21, 31 mounted therein that have a plurality of contacts 22, 32 mounted therein. The annular member 10 is mounted with its rear face 11 in contact with a forward face of the housing 30. The inner circumferential face 13 includes an angled surface which fits the angled surface on the connector insert 13 to secure the sealing member 10 in the connector housing 30. The other housing 20 includes an annular projection 25 having a radial width about the same as the diameter of the groove 15. When the coupling nut (not shown) mounted on one of the housings 30 is rotated it draws the two housings 20, 30 together so that the contacts are mated and the housings compress the annular member 10 as shown in FIG. 4.

FIG. 4 illustrates how the forward projection 25 on one housing 20 has deformed the annular member 10 so as to virtually eliminate the groove that was in the rear face of the member 10. The groove provides space for material displaced by the forward projection 25 of the housing 20 during mating of the contacts 22, 32. By providing a space for material to displace the housings 20, 30 can be drawn closer together thereby assuring better electrical contact between the mated electrical contacts (32, 22 FIG. 3). The space 15 also allows the projection 25 to penetrate deeper into the sealing member 10 thereby providing a better seal. The radially extending groove 16 shown in FIG. 1 allows the air to escape from the annular groove 15 when the forward projection 25 presses into the annular member 10.

While a preferred embodiment of the invention has been disclosed, it will be apparent to those skilled in the art that changes may be made in the invention as set forth in the appended claims and, in some instances, certain features of the invention may be used to advantage without corresponding use of the other features. For instance, the sealing member may or may not have the second radially extending groove 16 and still provide substantially all of its advantages. Accordingly, it is intended that the illustrative and descriptive materials herein be used to illustrate the principles of the invention and not to limit the scope thereof.

Having described the invention what is claimed is:

1. In combination with a separable electrical connector assembly of the type having first and second housings, each having a front face and separably connected together in face to face relationship [by a coupling nut mounted on one of the housings], the improvement comprising:

a compressible annular member having a rear face, a forward face, an inner circumferential face and an outer circumferential face;

[an] *a first* annular groove in the rear face of said annular member, [the forward face having an area less than the area of said rear face,] said annular member located in said first housing with the *first* annular groove located against and facing the front face of [first] said *first* housing; [and]

*a second groove in said rear face extending radially between the annular groove and the outer circumferential face; and* an annular projection in the front face of said second housing adapted to engage said compressible *annular* member upon connecting together *of* the two housings, said projection having a radial width about the same as the diameter of the groove in said member so that said annular groove accepts material displaced by the projection in the forward face of said second housing when said housings are connected together and said projection is pressed into said annular member [by rotation of said coupling nut].

2. The combination as recited in claim 1 wherein the annular member is comprised of rubber.

3. The combination as recited in claim 1 wherein at least one of said faces is a flat surface.

*4. The combination as recited in claim 1 wherein the forward face has an area less than the area of said rear face.*

*5. The combination as recited in claim 1 wherein a coupling nut is rotatably mounted to one said shell for connecting to the other shell whereby to axially advance the shells towards one another and axially compress the rear and forward faces of the annular member between the connected shells.*

* * * * *